A. L. CRITCHFIELD.
SEED CLEANING AND SEPARATING MACHINE.
APPLICATION FILED OCT. 15, 1913.
1,112,685.
Patented Oct. 6, 1914.
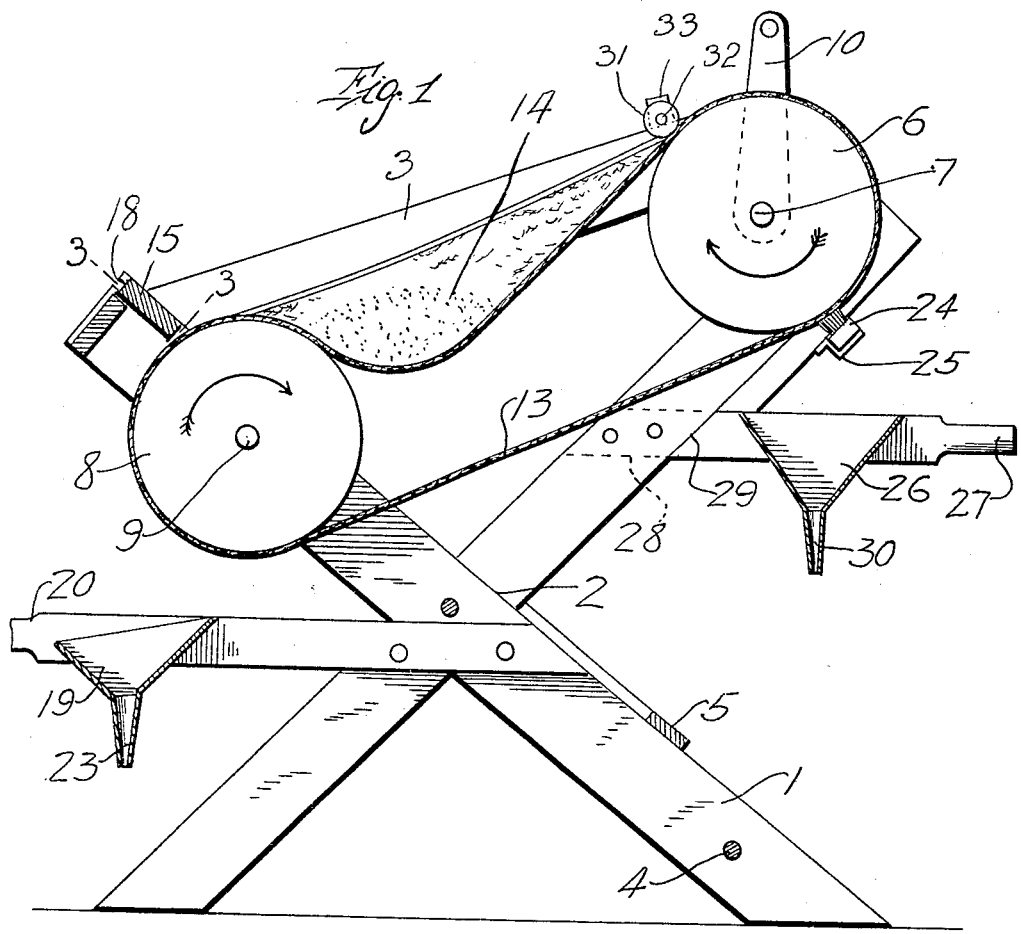
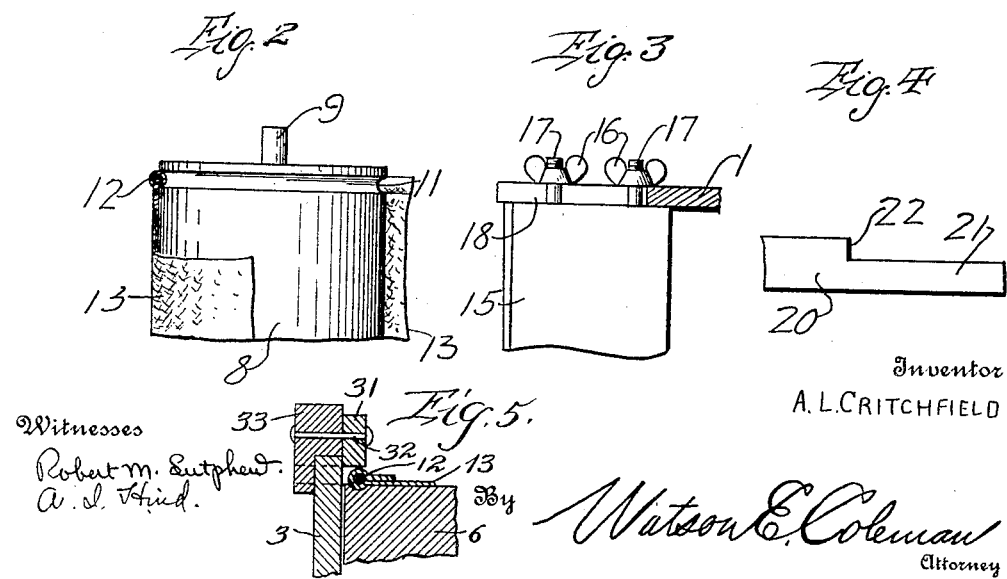
Witnesses
Robert M. Sutphen.
A. I. Hud.
Inventor
A. L. CRITCHFIELD
By Watson E. Coleman
Attorney
THE NORRIS PETERS CO., PHOTO-LITHO., WASHINGTON, D. C.

UNITED STATES PATENT OFFICE.

ARTHUR L. CRITCHFIELD, OF FARGO, INDIANA.

SEED CLEANING AND SEPARATING MACHINE.

1,112,685. Specification of Letters Patent. Patented Oct. 6, 1914.

Application filed October 15, 1913. Serial No. 795,362.

*To all whom it may concern:*

Be it known that I, ARTHUR L. CRITCHFIELD, a citizen of the United States, residing at Fargo, in the county of Orange and State of Indiana, have invented certain new and useful Improvements in Seed Cleaning and Separating Machines, of which the following is a specification, reference being had to the accompanying drawings.

This invention comprehends certain new and useful improvements in cleaning and separating machines, and relates more specifically to seed cleaning and separating machines, and has for a special object to provide a machine of this character which will be of extremely simple construction and operation and which will be highly efficient and effective when employed for the purpose of cleaning clover seed or the like and separating the same from plantain and other weed seeds, etc.

Another object is to provide a machine of this character provided with a cloth engaged over a pair of rollers and adapted to receive the clover seed and separate the plantain and other weed seeds and foreign matter from the clover seeds as the latter rest upon the cloth which is rotated over and around the rollers, it being understood that the cloth is loose, thus allowing the same to sag and form a pocket to accommodate the clover seeds during movement of the cloth, the plantain and other weed seeds and foreign matter adhering to the cloth and being thereby separated from the clover seed to be deposited in a trough provided for this purpose at one end of the machine.

Another object is to provide a machine of this character which will be highly efficient in the performance of its duties and which will be provided with a clover receiving trough and an adjustable front wall for the clover pocket, whereby the clover, after being cleaned and separated from the plantain seed, etc., may be readily deposited in the trough by raising the front wall of the pocket, it being understood that the rear roller is preferably positioned in a plane above the plane of the front roller, thereby placing the cloth at an incline.

Another object is generally to improve and simplify a device of this character and increase the durability and efficiency of the same.

With the above and other objects in view, my invention consists in the novel construction, combination and arrangement of parts to be hereinafter more fully described, claimed and illustrated in the accompanying drawing, in which, Figure 1 is a longitudinal vertical section through my complete device; Fig. 2 is a detail view of one end of one of the rollers, showing a portion of the continuous cloth member engaged thereover, said member being partly broken away and shown in section; Fig. 3 is a fragmentary detail view partly in section, showing the manner in which the adjustable end board of the seat is mounted; and Fig. 4 is a detail view of the inner end of one of the trough supporting handles. Fig. 5 is a fragmentary detail view in section of a part of the apparatus.

Referring more particularly to the drawing in which similar reference characters designate corresponding parts throughout the several views, 1 designates the standards forming the ends of the supporting frame, the standards being crossed intermediate of their ends, as shown at 2, and are connected at their upper ends by the inclined end pieces 3, it being understood that the standards which have their lower ends directed forwardly and their higher ends rearwardly, are longer than the other standards, thereby increasing the height of the rear end of the machinery. The standards 1 of the opposite ends of the machine are suitably connected and braced by the connecting and bracing rods 4 and strips 5, as clearly shown in the drawing.

A roller 6 has the opposite ends of its shaft 7 mounted for rotation in the upper ends of the opposite standards 1 at the rear of the machine while a similar roller 8 has the opposite ends of its shaft 9 mounted for rotation in the opposite ends of the remaining standards 1, at the front of the machine. One end of the shaft 7 for the roller 6 is extended beyond the end of the standards within which it is mounted and has the crank 10 mounted thereon, by means of which the machine may be readily operated, as will be later clearly apparent. Each of the rollers 6 and 8 is provided with a circumscribing groove 11 adjacent its opposite ends to accommodate the continuous cords 12 which are secured to the opposite edges of the continuous cloth 13, preferably heavy unbleached cloth, which is secured to the cords in such manner that while the cords 12 bind in the grooves 11 to cause the cloth to move over the rollers 6 and 8, said cloth will be permitted to sag between the rollers, thereby providing a pocket at all times between said rollers 6 and 8 to accommodate the clover seeds as indicated at 14. A front wall 15 is provided for the clover seed pocket to prevent the clover seeds from rolling off the forward end of the machine during operation of the same and said front wall is mounted between the upper ends of the short standards 1 at the front of the machine and adapted to be adjusted longitudinally between said standard ends, as will be clearly understood, and secured in adjusted position by the tightening thumb nuts 16 on the ends of the threaded studs 17 projecting from the opposite ends of the front wall 15 and extending through the longitudinal slots 18 in the upper ends of the short standards 1.

It will be understood that when the front wall 15 is in its lowermost position, the lower edge thereof bears lightly against the continuous cleaning and separating cloth 13 as the same passes over the lower or forward roller 8. It will also be understood that when the front wall 15 is raised, however, the clover seed will be allowed to move over the roller 8 and drop into the clover seed receiving trough 19 which is secured at its opposite ends to the inner faces of the handles 20 projecting forwardly from the lower portions of the standards 1, it being understood that the rear ends of the handles 20 are reduced in thickness, as shown at 21, and secured to the inner faces of the standards 1, below the point at which said standards are crossed, thereby providing the shoulders 22 for engagement against the front faces of the forward or lower portions of the long standards 1, as clearly shown in Fig. 1. While the trough 19 is shown as being of substantially V-shaped form in cross section, it will be understood that any suitable form of trough may be employed, and the trough 19 is preferably provided with the depending spout 23 at its lowermost portion intermediate of its ends, to direct the clover seed to any suitable receptacle placed beneath the spout.

As the crank 10 is operated to cause the cords 12 to move in the grooves 11 and move the continuous cloth 13 from under the lower roller 8 around the same and up and around the upper roller 6, the flat side of plantain seeds and other weed seeds and foreign matter will adhere to the cloth 13 as the same moves upwardly and over the upper roller 6 while the clover seed will simply turn or revolve upon the cloth and drop back again to the pocket. As the cloth 13 travels around the upper roller 6, the plantain seed and other foreign matter will be brushed off of the cloth by means of the long brush 24 engaged with said cloth and having its opposite ends secured to the rear faces of the upper portions of the long standards 1, as shown at 25, said brush extending transversely of the machine. It will be evident that as the plantain seed and other foreign matter are brushed off of the cloth 13, the same will drop into the rear upper trough 26 beneath the roller 6 and upper end of the cloth 13, it being understood that the opposite ends of the trough 26 which is also preferably of V-shaped form in cross-section, are secured to the rearwardly directed handles 27, which have their rear ends reduced in thickness and secured to the outer faces of the upper portions of the standards 1, as shown at 28, thereby providing the shoulders 29 engaged with the rear faces of the upper portions of the long standards 1, as will be clearly understood by referring to the drawing. The trough 26 is also provided with the spout 30 to direct the matter deposited in the trough to a suitable receptacle placed beneath the spout as will be clearly understood.

While I have shown the preferred form of my invention it will be understood that minor changes in the details of construction may be made within the scope of the appended claim without departing from the spirit of my invention.

The cords 12 are retained in the grooves 11 by means of the small guide rollers 31 mounted on the pins 32 in the free ends of the short arms 33 secured on the upper edges of the inclined end pieces 3 near the upper ends thereof, and projecting laterally and inwardly from said end pieces 3, as will be clearly understood by referring to the drawing.

What I claim is:—

A seed cleaning and separating machine comprising a frame, terminally circumferentially grooved rollers supported thereby in parallel relation but in different planes, an endless apron having corded edges engaging the grooves in the rollers and being of a length to permit its upper lead to sag to provide a seed receiving pocket, an adjustable wall coacting with the apron over the lower roller and constituting a cut-off, means coacting with the under portion of the higher roller to remove accumulated material therefrom, rollers carried by the frame and engaging the corded edges of the apron adjacent to the higher roller to retain the edges in the grooves thereof, and means for revolving the latter roller.

In testimony whereof I hereunto affix my signature in the presence of two witnesses.

ARTHUR L. CRITCHFIELD.

Witnesses:
 MARTHA PITTMAN,
 CORA M. PITTMAN.

Copies of this patent may be obtained for five cents each, by addressing the "Commissioner of Patents, Washington, D. C."